US010760702B2

(12) United States Patent
Fuller et al.

(10) Patent No.: US 10,760,702 B2
(45) Date of Patent: Sep. 1, 2020

(54) BI-STABLE TWO-PORT VALVE

(71) Applicant: DunAn Microstaq, Inc., Austin, TX (US)

(72) Inventors: E. Nelson Fuller, Manchester, MI (US); Parthiban Arunasalam, Austin, TX (US); Kevin C. Sinkar, Austin, TX (US); Dhaman K. Besarla, Leander, TX (US); Gengxun K. Gurley, Hutto, TX (US); Joe A. Ojeda, Austin, TX (US); Chen Yang, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 61 days.

(21) Appl. No.: 16/236,913

(22) Filed: Dec. 31, 2018

(65) Prior Publication Data

US 2019/0257439 A1 Aug. 22, 2019

Related U.S. Application Data

(60) Provisional application No. 62/632,232, filed on Feb. 19, 2018.

(51) Int. Cl.
*F16K 31/06* (2006.01)
*F16K 31/08* (2006.01)

(52) U.S. Cl.
CPC ...... *F16K 31/0658* (2013.01); *F16K 31/0651* (2013.01); *F16K 31/0679* (2013.01); *F16K 31/082* (2013.01); *F16K 31/0655* (2013.01); *F16K 31/08* (2013.01); *F16K 31/084* (2013.01)

(58) Field of Classification Search
CPC ............... F16K 31/082; F16K 31/0679; F16K 31/0658; F16K 31/0651; F16K 31/0655; F16K 31/084; F16K 31/08
See application file for complete search history.

(56) References Cited

U.S. PATENT DOCUMENTS 802,945 A * 10/1905 Waterman ........... F16K 31/0679 251/129.1
1,028,657 A * 6/1912 Aubert ............... F16K 31/0679 251/129.1

(Continued)

OTHER PUBLICATIONS

Hiemstra, "The Design of Moving Magnet Actuators for Large-Range Flexure-Based Nanopositioning", Thesis for Degree of Master of Science in Engineering, 2014, pp. 1-317.

(Continued)

*Primary Examiner* — Umashankar Venkatesan
(74) *Attorney, Agent, or Firm* — MacMillan, Sobanski & Todd, LLC

(57) ABSTRACT

An electronically switchable, bi-stable two-port valve includes a sleeve, a first pole piece having air flow passages formed therethrough and a first wire-wound coil mounted therein and connected to a source of electrical power, a second pole piece having air flow passages formed therethrough and a second wire-wound coil mounted therein and connected to the source of electrical power, and a permanent magnet defining an armature and movably mounted between the first and second pole pieces. The first pole piece is mounted in a first end of the sleeve and the second pole piece is mounted in a second end of the sleeve.

16 Claims, 3 Drawing Sheets

(56) References Cited

U.S. PATENT DOCUMENTS

| | | | | | |
|---|---|---|---|---|---|
| 1,090,902 | A | * | 3/1914 | Beckwith | F16K 31/0679 251/129.1 |
| 2,865,400 | A | * | 12/1958 | Stallard | F16K 31/0679 137/596.16 |
| 2,983,278 | A | * | 5/1961 | Heintz | F15B 13/0438 137/82 |
| 3,178,151 | A | * | 4/1965 | Caldwell | H01F 7/1615 251/129.1 |
| 3,383,084 | A | * | 5/1968 | Mayfield | F16K 31/0651 251/75 |
| 3,412,971 | A | * | 11/1968 | McDivitt | B05B 12/12 251/129.1 |
| 3,758,071 | A | * | 9/1973 | Anderson | F16K 31/0651 251/129.21 |
| 3,809,123 | A | * | 5/1974 | Heimann | F16K 31/082 137/625.5 |
| 4,253,493 | A | * | 3/1981 | English | F01L 9/04 137/625.18 |
| 4,422,060 | A | * | 12/1983 | Matsumoto | H01F 7/13 335/234 |
| 4,533,890 | A | * | 8/1985 | Patel | F01L 9/04 310/14 |
| 10,190,702 | B2 | | 1/2019 | Fuller et al. | |

OTHER PUBLICATIONS

Meneroud et al., “Bistable Micro Actuator for Energy Saving”, Actuator, 2006, pp. 744-747.

* cited by examiner

BI-STABLE TWO-PORT VALVE

BACKGROUND OF THE INVENTION

This invention relates in general to a valve for controlling the flow of air. In particular, this invention relates to an improved structure for an electronically switchable, bi-stable two-port valve configured to control air flow.

Extremely small and reliable air flow valves are not available for some applications, especially low pressure applications, for example, in applications where the pressure is about 1 atmosphere or smaller, such as may occur in a change of altitude from between about 12,000 to about 30,000 feet to about sea level. Thus, it would be desirable to provide an improved and small structure for an air flow valve for use in low pressure applications.

SUMMARY OF THE INVENTION

This invention relates to an improved structure for an electronically switchable, bi-stable two-port valve. The electronically switchable, bi-stable two-port valve includes a sleeve, a first pole piece having air flow passages formed therethrough and a first wire-wound coil mounted therein, and a second pole piece having air flow passages formed therethrough and a second wire-wound coil mounted therein. The first pole piece is mounted in a first end of the sleeve and the second pole piece is mounted in a second end of the sleeve, and a permanent magnet defines an armature and is movably mounted between the first and second pole pieces.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
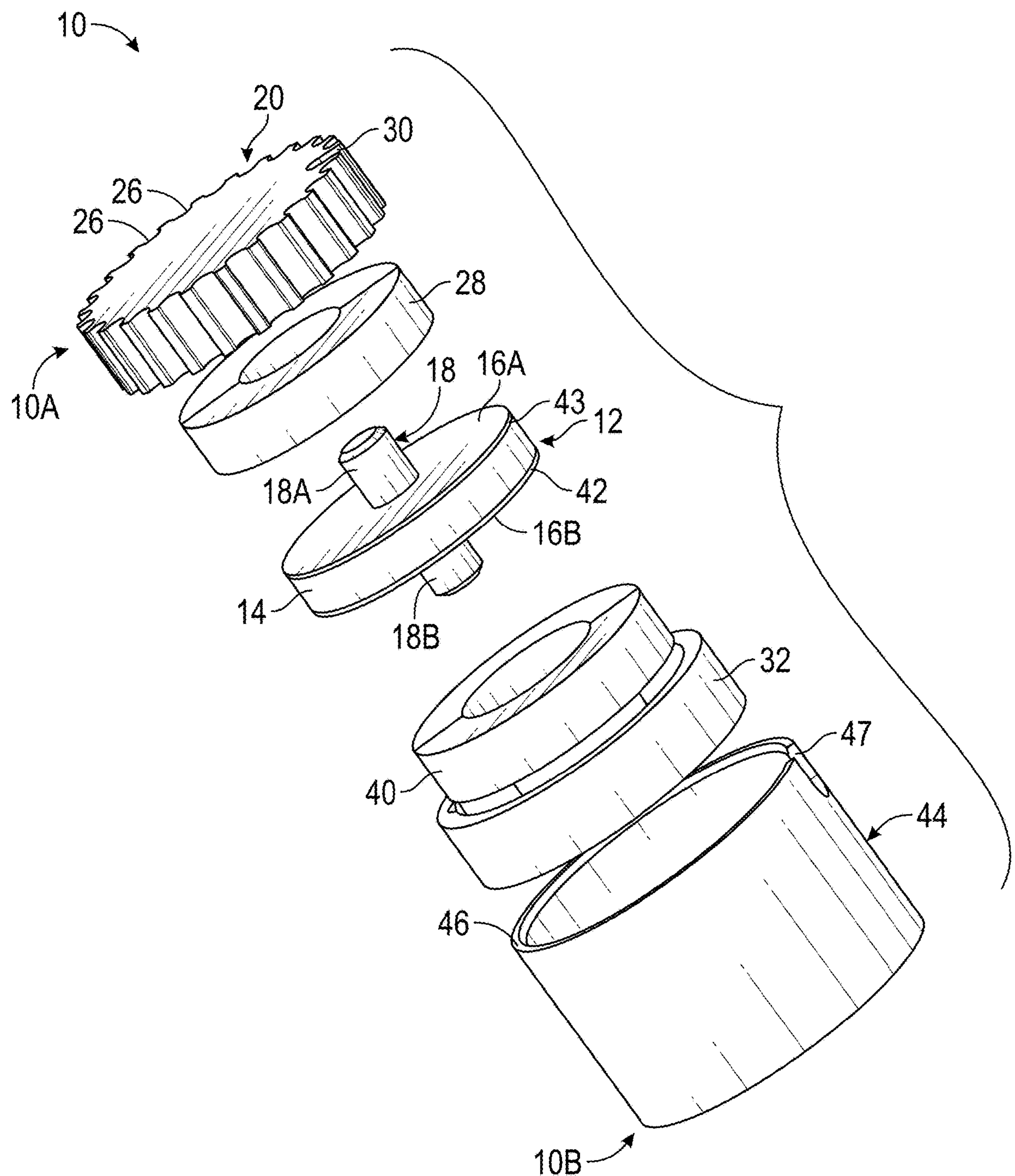
FIG. 1 is a partially exploded perspective view of an improved electronically switchable, bi-stable two-port valve in accordance with this invention.
Figure 2:
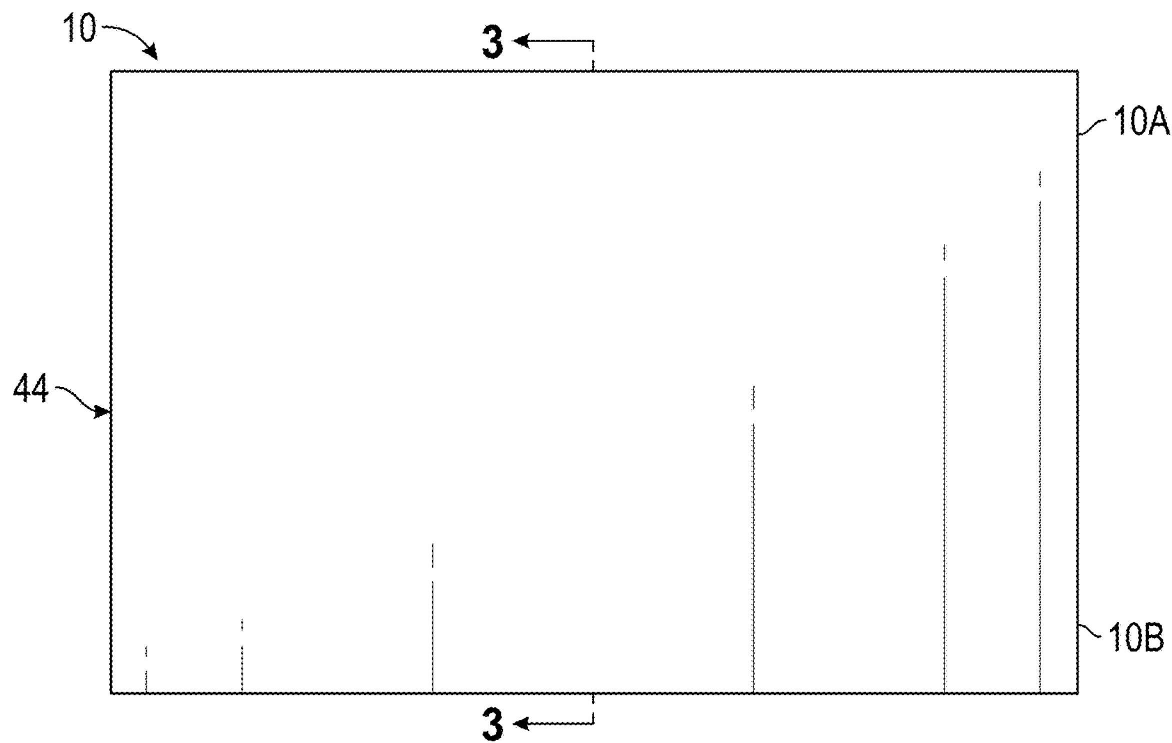
FIG. 2 is a side elevational view of the electronically switchable, bi-stable two-port valve illustrated in FIG. 1.

Referring now to the drawings, there is illustrated in FIGS. 1 through 5 an improved moving magnet valve (MMV) 10. The MMV 10 is an electronically switchable, bi-stable two-port valve that may be configured as a normally closed valve or a normally open valve. The electronically switchable, bi-stable two-port valve 10 has an axis A, a first end 10A (the upper end when viewing FIGS. 1 through 5), and a second end 10B (the lower end when viewing FIGS. 1 through 5). A permanent magnet defines an armature 12. The armature 12 includes a substantially disk shaped body 14 having a first planar surface 16A (the upper end when viewing FIGS. 1 and 3), a second planar surface 16B (the lower end when viewing FIGS. 1 and 3), and a longitudinally extending bore 13 formed therethrough.

An axially extending member 18 is attached within the bore 13 and includes a first axially extending portion 18A that extends outwardly from the first planar surface 16A, and a second axially extending portion 18B that extends outwardly from the second planar surface 16B. The first axially extending portion 18A and the second axially extending portion 18B are substantially cylindrical in shape. A central portion 18C of the axially extending member 18 may have a diameter larger than a diameter of the first and second axially extending portions 18A and 18B. The axially extending member 18 is preferably formed from a non-magnetic material, such as brass or plastic, and may be attached within the bore 13 of the body 14 of the armature 12 by an desired means, such as by press-fitting, staking, with an adhesive, and the like.

An annular resilient seal 42 may be attached to the second planar surface 16B. Similarly, an annular resilient member 43 may be attached to the first planar surface 16A. The seal 42 and the resilient member 43 may be formed from an elastomeric material, such as rubber. Alternatively, the seal 42 and the resilient member 43 may be formed from any other deformable material, such as urethane, nitrile, or other polymers.

As used herein, a permanent magnet is defined as a magnet formed from hard magnetic material or ferromagnetic material that exhibits strong magnetization in the absence of an external magnetic field. Once magnetized, permanent magnets tend to stay magnetized.

A first pole piece 20 is substantially cylindrical, and has a circular coil groove 22, a centrally formed, and axially extending armature receiving bore 24 formed therein. An outside surface of the first pole piece 20 includes a plurality of axially extending grooves 26 formed therein. The grooves 26 define either air inlet ports or air outlet ports. The outside surface of the first pole piece 20 also includes at least one wire groove 30 formed therein, the purpose of which will be explained in detail below. The wire groove 30 may have a radial length greater than a radial length of the axially extending grooves 26. In the illustrated embodiment, the grooves 26 have a substantially semi-circular cross-sectional shape and a radius of about 0.25 mm. Alternatively, the grooves 26 may have any desired size, such as a radius within about 0.25 mm to about 0.3 mm.

A magnetic field generating member is configured as a first wire-wound coil 28 and is seated in the coil groove 22.

A second pole piece 32 is substantially cylindrical, and has a circular coil groove 34 and a centrally formed and axially extending armature receiving bore 36 formed therein. A plurality of axially extending passageways 38 are formed through the second pole piece 32 about the armature receiving bore 36. The passageways 38 define either air inlet ports or air outlet ports. An axially extending wire bore 39 may also be formed through an axial end wall of the coil groove 34, the purpose of which will be explained in detail below. In the illustrated embodiment, the passageways 38 have a diameter of about 0.75 mm. Alternatively, the passageways 38 have any desired size, such as a diameter within about 0.75 mm to about 1.0 mm.

A second wire-wound coil 40 is similar to the first wire-wound coil 28 and is seated in the coil groove 34. The first and second wire-wound coils 28 and 40 may be conventional in the art and thus include wires (not shown) that electrically connect the first and second wire-wound coils 28 and 40 to a source of electrical power (not shown). The wires (not shown) connected to the first wire-wound coil 28 may extend through the wire groove 30 formed in first pole piece 20 and outward from the MMV 10. Similarly, the wires (not shown) connected to the second wire-wound coil 40 may extend through the wire bore 39 formed in second pole piece 32 and outward from the MMV 10.

The first pole piece 20 and the second pole piece 32 may be formed from any desired ferromagnetic material such as steel, including mild steel. Alternatively, the first pole piece 20 and the second pole piece 32 may be formed from any other desired material, such as low carbon steel and silicon steel.

Figure 3:
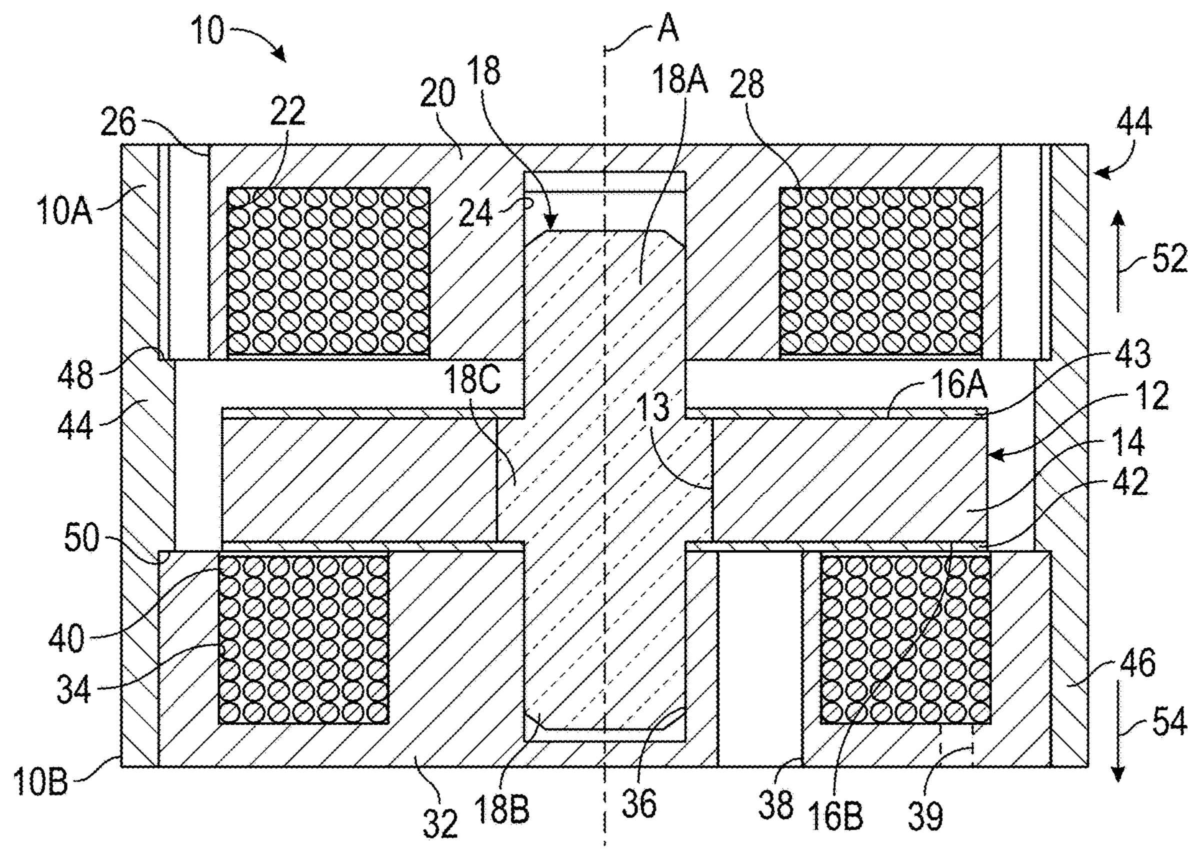
FIG. 3 is a cross-sectional view taken along the line 3-3 of FIG. 2 showing the electronically switchable, bi-stable two-port valve in the closed position.
Figure 4:
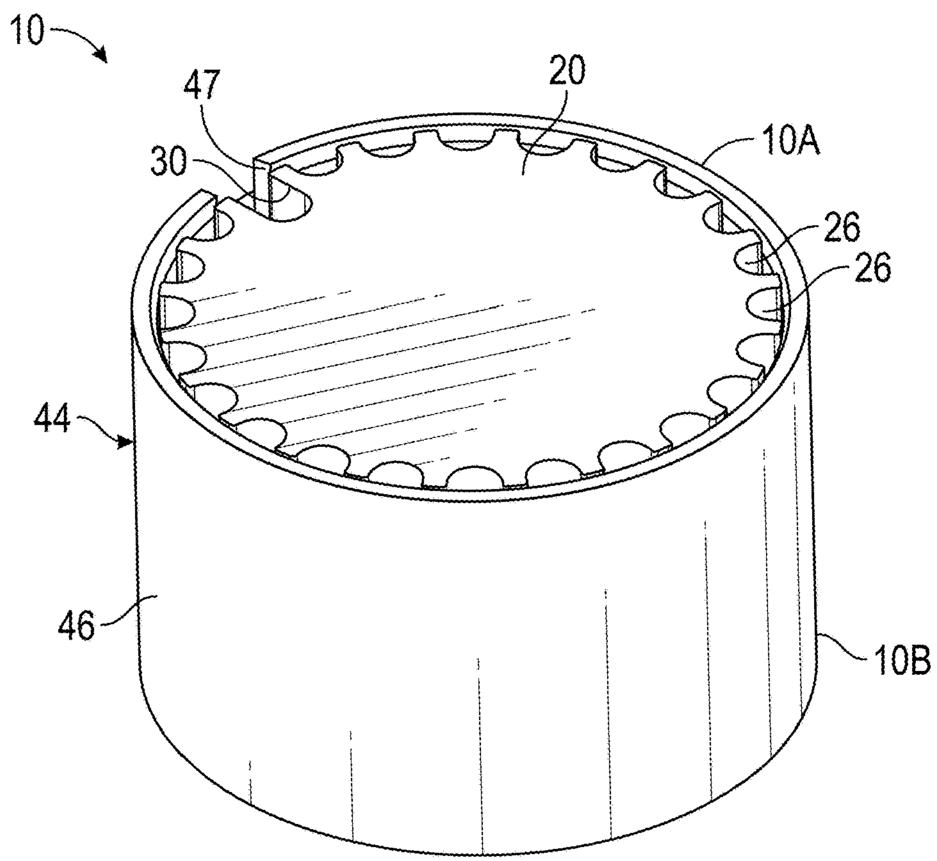
FIG. 4 is a perspective view of the electronically switchable, bi-stable two-port valve illustrated in FIGS. 1 through 3 showing the first end thereof.
Figure 5:
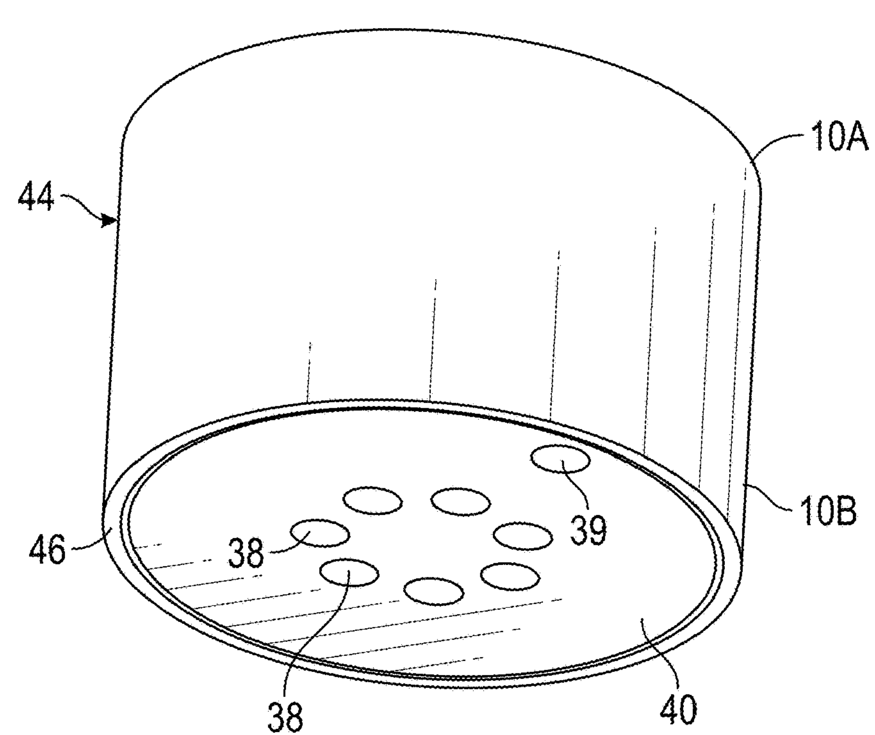
FIG. 5 is a perspective view of the electronically switchable, bi-stable two-port valve illustrated in FIGS. 1 through 4 showing the second end thereof.

A cylindrical valve housing or sleeve 44 includes a wall 46. An inside surface of the wall 46 has a first circumferentially extending shoulder 48 and a second circumferentially extending shoulder 50 formed therein. When the MMV 10 is assembled, the first pole piece 20 is seated against the first shoulder 48 and the second pole piece 32 is seated against the second shoulder 50. As best shown in FIG. 3, the first axially extending portion 18A is slidably mounted within the armature receiving bore 24 and the second axially extending portion 18B is slidably mounted within the armature receiving bore 36. The sleeve 44 may be formed from steel such as mild steel. Alternatively, the sleeve 44 may be formed from any other desired material, such as low carbon steel and silicon steel.

An axially extending slot 47 may be formed in the wall 46 and radially aligned with the wire groove 30. In the illustrated embodiment, the sleeve 44 has a height of about 6.0 mm and a diameter of about 8.0 mm. Alternatively, the sleeve 44 may have any desired size, such as a height within about 4.0 mm to about 6.0 mm, and a diameter within about 8.0 mm to about 9.0 mm.

In the embodiment illustrated in FIG. 3, the MMV 10 is shown in the closed position, wherein the second planar surface 16B of the armature 12, and the attached resilient seal 42, is urged into contact with an axial end of the second pole piece 32 (the upper end when viewing FIG. 3), closing the passageways 38. In the open position (not shown), the first planar surface 16A of the armature 12, and the attached resilient member 43, is urged against the first pole piece 20. The magnetic attraction between the armature 12 and either the first pole piece 20 or the second pole piece 32 holds the armature 12 in a fixed position until an electric current is passed through the second wire-wound coil 40 or the first wire-wound coil 28, respectively.

In the absence of an electric current in either the first or the second wire-wound coils 28 and 40, respectively, the armature 12 forms a magnetic circuit with one of the pole pieces 20 or 32 to maintain the armature 12 in either the open or the closed position (see FIG. 3). The force between the armature 12 and either the first pole piece 20 or the second pole piece 32 is sufficient to hold the armature 12 against vibration and/or flow or pressure forces attempting to move the armature 12, but low enough that the force may be overcome by the magnimotive force of the first and/or the second wire-wound coils 28 and 40 to switch between open and closed positions.

As further shown in FIG. 3, airflow through the MMV 10 is in the direction of the arrow 54. Thus, the grooves 26 define air inlet ports and the passageways 38 define air outlet ports. Alternatively, the MMV 10 may be configured such that the direction of the airflow is reversed and in the direction of the arrow 52. In this arrangement, the passageways 38 define air inlet ports and the grooves 26 define air outlet ports.

In a conventional manner, the first and second wire-wound coils 28 and 40 may be configured to generate a desired magnetic field, such as a magnetomotive force between about 140 to about 180 amp-turns.

In the absence of an electric current in either of the first or the second wire-wound coils 28 and 40, the armature 12 will remain in either the open position (not shown) or the closed position (see FIG. 3). In FIG. 3, the MMV 10 is shown in the closed position, wherein the second planar surface 16B of the armature 12, and the seal 42 attached thereto, is urged into contact with an axial end of the second pole piece 32 (the upper end when viewing FIG. 3).

In the open position (not shown), the first planar surface 16A of the armature 12 is urged against the first pole piece 20. The magnetic attraction between the armature 12 and either the first pole piece 20 or the second pole piece 32 holds the armature 12 in a fixed position until an electric current is passed through the second wire-wound coil 40 or the first wire-wound coil 428, respectively.

In operation, the MMV 10 may be toggled or moved between the closed position as shown in FIG. 3 and the open position (not shown). In the closed position, the armature 12, and the seal 42 attached thereto, is urged into contact with an axial end of the second pole piece 32 (the upper end when viewing FIG. 3). The armature 12 thus closes the passageways 38 such that the flow of air therethrough is prevented. The force due to the air pressure applied to the MMV 10 through the grooves 26 and the magnetic force between the armature 12 and the second pole piece 32 maintains the MMV 10 in the closed position.

A brief application of electric current, such as within the range of about 50 Msec to about 200 Msec, to the MMV coils 28 and 40 is sufficient to move the MMV 10 between open and closed positions.

When the MMV 10 is in the closed position as shown in FIG. 3, and the electric current has been removed from the second wire-wound coil 40, the magnetic force between the armature 12 and the second pole piece 32 maintains the MMV 10 in the closed position. When an electric current is then briefly passed through the first wire-wound coil 28, the first pole piece 20 is magnetized, and the strength of the magnetic force between the armature 12 and the first pole piece 20 is greater relative to the strength of the magnetic force between the armature 12 and the second pole piece 32. The armature 12 then moves toward the first pole piece 20; i.e., in the direction of the arrow 52, until the armature 12, and the resilient member 43 attached thereto, is urged into contact with an axial end of the first pole piece 20 (the lower end when viewing FIG. 3), thus moving the MMV 10 to the open position. When the brief application of electric current to the first wire-wound coil 28 is removed, the magnetic force between the armature 12 and the first pole piece 20 maintains the MMV 10 in the open position.

In the open position, armature 12 is moved away from the second pole piece 32, thus opening the passageways 38 such that the flow of air therethrough is permitted. It will be appreciated that when the MMV 10 is in either the closed position or the open position, the grooves 26 are not closed by the armature 12.

The MMV 10 may be moved from the open position to the closed position in the same way. Thus, when the MMV 10 in the open position, and when an electric current is then briefly passed through the second wire-wound coil 40, the second pole piece 32 is magnetized, and the strength of the magnetic force between the armature 12 and the second pole piece 32 is greater relative to the strength of the magnetic force between the armature 12 and the first pole piece 20.

The armature 12 then moves toward the second pole piece 32; i.e., in the direction of the arrow 54, until the armature 12, and the seal 42 attached thereto, is again urged into contact with the axial end of the second pole piece 32 (the upper end when viewing FIG. 3), and into the closed position. Thus by alternatingly applying an electric current to the first and second wire-wound coils 28 and 40, the MMV 10 may be toggled or moved between the closed position as shown in FIG. 3 and the open position (not shown).

In a first alternative embodiment, an electric current may be applied briefly and simultaneously to the first wire-wound coil 28 and the second wire-wound coil 40 such that the electric current flows in a clockwise direction in one of the first or the second wire-wound coils 28 and 40 and in a counterclockwise direction in the other of the first or the second wire-wound coils 28 and 40. When the electric current is briefly applied in this manner, the MMV 10 will move alternately between the open and closed positions each time the electric current is briefly applied.

In a second alternative embodiment, an electric current may be applied briefly and simultaneously to the first wire-wound coil 28 and the second wire-wound coil 40 such that the electric current flows in the same direction, i.e., either in a clockwise direction or in a counterclockwise direction, in both the first and second wire-wound coils 28 and 40. When the electric current is briefly applied in this manner, the MMV 10 will move alternately between the open and closed positions each time the electric current is briefly applied.

Advantageously, the MMV 10 may remain in either the closed position, as shown in FIG. 3, or the open position (not shown) when power has been removed from the first wire-wound coil 28 and the second wire-wound coil 40.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electronically switchable, bi-stable two-port valve comprising:

a sleeve;

a first pole piece having air flow passages formed therethrough and a first wire-wound coil mounted therein and connected to a source of electrical power;

a second pole piece having air flow passages formed therethrough and a second wire-wound coil mounted therein and connected to the source of electrical power;

wherein the first pole piece is mounted in a first end of the sleeve and the second pole piece is mounted in a second end of the sleeve; and a permanent magnet defining an armature and movably mounted between the first and second pole pieces;

wherein the armature includes a substantially disk shaped body having a first planar surface, a second planar surface, and a longitudinally extending bore formed therethrough, and wherein an axially extending member is attached within the longitudinally extending bore and includes a first axially extending portion that extends outwardly from the first planar surface and a second axially extending portion that extends outwardly from the second planar surface.

2. The electronically switchable, bi-stable two-port valve according to claim 1, wherein the first and second wire-wound coils have a magnetomotive force between about 140 to about 180 amp-turns.

3. The electronically switchable, bi-stable two-port valve according to claim 1, wherein the first pole piece is substantially cylindrical, and has a circular coil groove and a centrally formed and axially extending armature receiving bore formed therein.

4. The electronically switchable, bi-stable two-port valve according to claim 3, wherein an outside surface of the first pole piece includes a plurality of axially extending grooves formed therein, the grooves defining one of air inlet ports and air outlet ports.

5. The electronically switchable, bi-stable two-port valve according to claim 4, wherein the outside surface of the first pole piece further includes at least one wire groove formed therein.

6. The electronically switchable, bi-stable two-port valve according to claim 1, wherein the second pole piece is substantially cylindrical, and has a circular coil groove and a centrally formed and axially extending armature receiving bore formed therein.

7. The electronically switchable, bi-stable two-port valve according to claim 6, wherein a plurality of axially extending passageways are formed through the second pole piece about the armature receiving bore, the passageways defining one of air inlet ports and air outlet ports.

8. The electronically switchable, bi-stable two-port valve according to claim 7, wherein an axially extending wire bore is formed through an axial end wall of the coil groove.

9. The electronically switchable, bi-stable two-port valve according to claim 1, wherein the first and second pole pieces are formed from ferromagnetic material.

10. The electronically switchable, bi-stable two-port valve according to claim 1, wherein a central portion of the axially extending member has a diameter larger than a diameter of the first and second axially extending portions and is attached within the longitudinally extending bore of the body of the armature.

11. The electronically switchable, bi-stable two-port valve according to claim 10, further including one of a resilient seal attached to the second planar surface and a resilient member attached to the first planar surface.

12. A method of controlling an electronically switchable, bi-stable two-port valve, the method comprising:

providing an electronically switchable, bi-stable two-port valve having a sleeve, a first pole piece having air flow passages formed therethrough and a first wire-wound coil mounted therein and connected to a source of electrical power, a second pole piece having air flow passages formed therethrough and a second wire-wound coil mounted therein and connected to the source of electrical power, wherein the first pole piece is mounted in a first end of the sleeve and the second pole piece is mounted in a second end of the sleeve, and a permanent magnet defining an armature and movably mounted between the first and second pole pieces;

applying an electric current to the first wire-wound coil to magnetize the first pole piece, thus causing the armature to move toward the first pole piece and to an open position;

removing the electric current from the first wire-wound coil; and subsequently applying an electric current to the second wire-wound coil to magnetize the second pole piece, thus causing the armature to move toward the second pole piece and to a closed position;

wherein the armature includes a substantially disk shaped body having a first planar surface, a second planar surface, and a longitudinally extending bore formed therethrough, and wherein an axially extending member is attached within the longitudinally extending bore and includes a first axially extending portion that extends outwardly from the first planar surface and a second axially extending portion that extends outwardly from the second planar surface.

13. The method according to claim 12, further including alternatingly applying electric current to the first and second wire-wound coils to cause the armature to move alternatingly between the open and the closed positions.

14. The method according to claim 13, wherein the electric current applied to the first and second wire-wound coils is sufficient to create a magnetomotive force between about 140 to about 180 amp-turns.

15. The method according to claim 13, further including removing the electric current from both the first and second wire-wound coils, thus causing the armature to be held against the one of the first and second pole pieces to which the armature is closest.

16. The method according to claim 12, wherein when the electric current is removed from one of the first wire-wound coil and the second wire-wound coil, the armature forms a magnetic circuit with one of the first pole piece and the second pole piece to maintain the armature in one of the open position and the closed position.

* * * * *